July 2, 1963  G. Y. ONO  3,095,712
DRIVE COUPLING
Filed Sept. 23, 1957  2 Sheets-Sheet 1

Inventor
George Y. Ono
by Hill, Sherman, Meroni, Gross & Simpson Attys

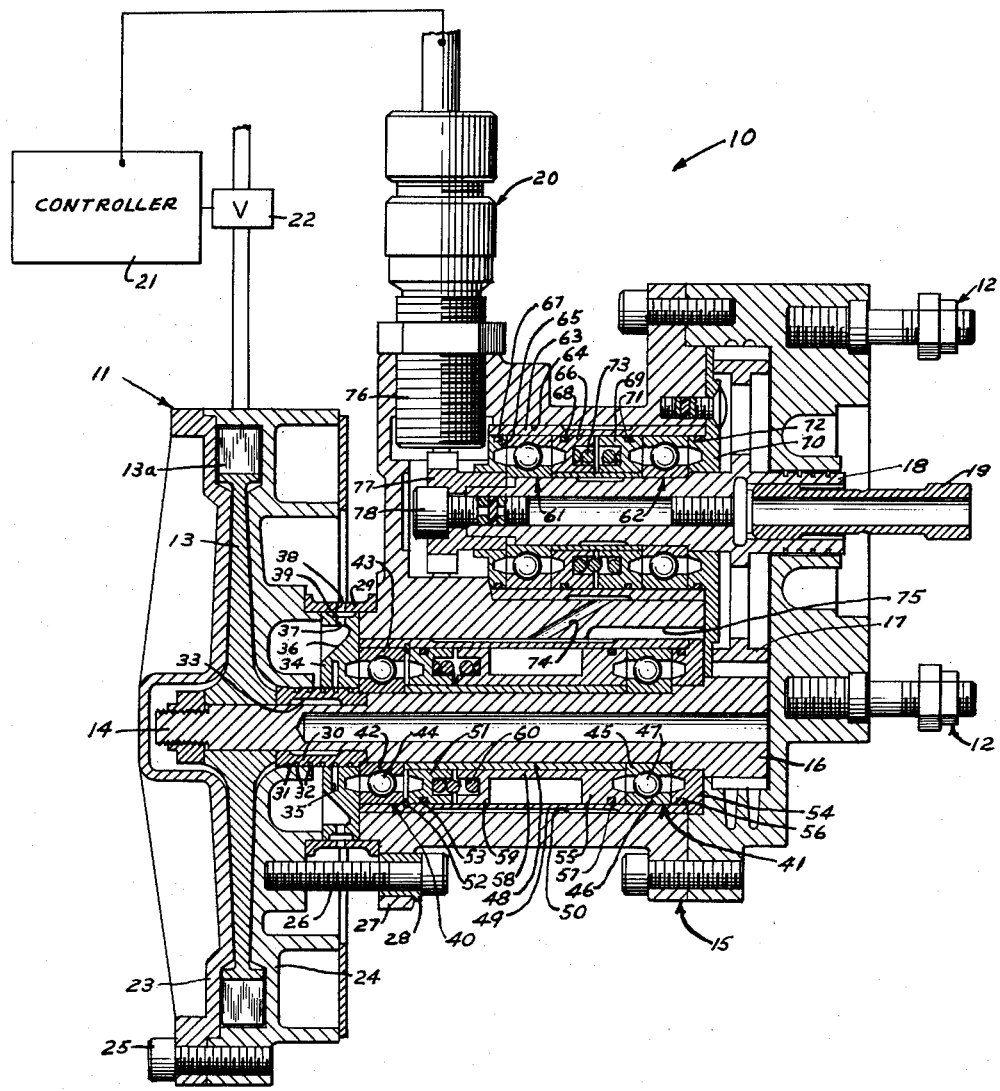

3,095,712
DRIVE COUPLING
George Y. Ono, Mayfield Heights, Ohio, assignor to Thompson Ramo Wooldridge Inc., a corporation of Ohio
Filed Sept. 23, 1957, Ser. No. 685,603
1 Claim. (Cl. 64—3)

This invention relates to a gear box and more particularly to a unit for drivingly connecting a load to a motive power source.

The coupling unit of this invention was particularly designed for use in aircraft such as airplanes, rockets, missiles, etc. in which there is available high pressure fluid, such as air from an engine compressor, and in which it is desired to operate a load device such as a pump of an hydraulic system. In such installations, it is desirable to use a turbine as the motive power source, which is advantageously operated at very high speeds to obtain maximum power output relative to its size and weight. The load device, however, may advantageously be operated at a substantially lower speed and it is therefore necessary to provide a speed reduction between the turbine and the load. It is also desirable to provide means for regulating the operation of the turbine, which may include a device for sensing the speed of operation thereof.

Certain problems are encountered with such a system. In particular, the turbine is generally operated at a very high temperature and there is a severe problem with respect to heating of bearings and other elements. Another problem is that the drive coupling must be capable of withstanding high rates of acceleration and deceleration.

An object of this invention, accordingly, is to provide a drive coupling unit which may be connected to a high temperature motive power source, but with heating of bearings and other elements being minimized.

Another object of this invention is to provide a drive coupling unit which will stand severe accelerations.

A further object of this invention is to provide a drive coupling unit which is simply and readily constructed and assembled, and yet efficient and reliable in operation.

An important feature of this invention is in the use of heat dams to isolate grease, bearings and other elements from the high temperatures developed in a motive power source such as a turbine.

Another important feature of this invention is based on the discovery that grease flow during high accelerations can result in the loss of grease and other improper operation. According to this invention, the grease chambers are made of minimum size which it is found results in good retention of the grease.

This invention contemplates other and more specific objects, features and advantages which will become more fully apparent from the following detailed description taken in conjunction with the accompanying drawings which illustrate a preferred embodiment and in which:

FIGURE 3 is a cross-sectional view taken substantially along line III—III of FIGURE 1.

Figure 1:
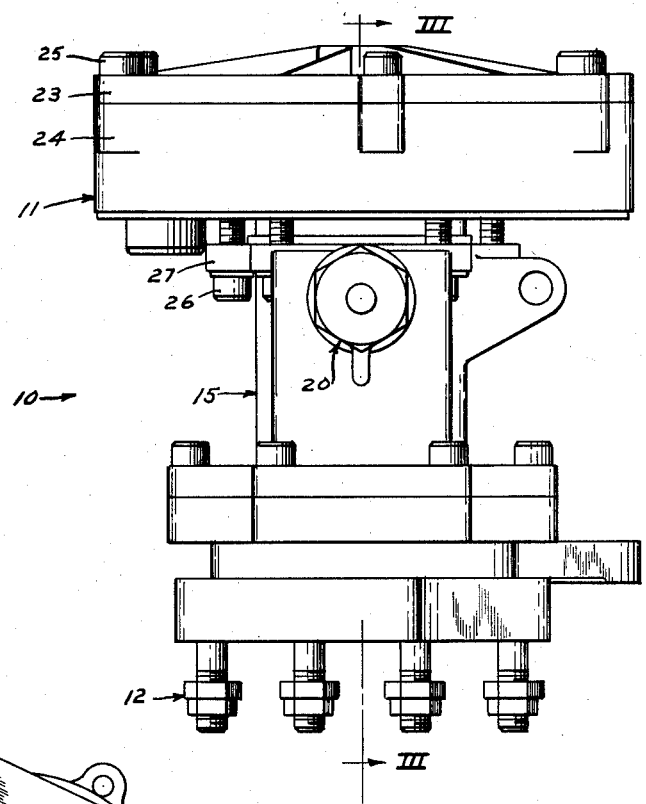
FIGURE 1 is a top plan view of a turbine and gear box assembly constructed according to the principles of this invention.
Figure 2:
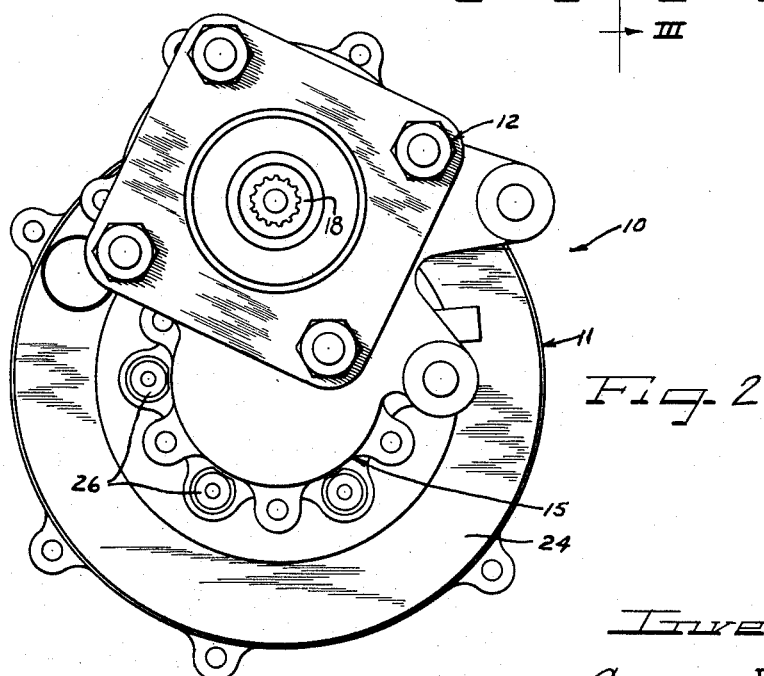
FIGURE 2 is an end elevational view of the assembly of FIGURE 1.

Reference numeral 10 generally designates a drive coupling unit which is connected to a turbine generally designated by reference numeral 11 and a load device, not shown, which is secured to the unit 10 by means of bolts 12. The turbine 11 comprises a rotor 13 including peripherally spaced vanes 13a, the rotor 13 being mounted on one end of a shaft 14 which is journaled in the housing of the coupling unit 10, the housing being indicated by reference numeral 15. The other end of the shaft 14 carries a pinion 16 which is meshed with a gear 17 on a second shaft 18 which is journalled for rotation in the housing 15 on an axis parallel to the axis of the shaft 14. A coupling member 19 extends within an end portion of the shaft 18 with a spline coupling therebetween the coupling member 19 being arranged to be coupled to the hydraulic pump which forms the load device.

An electrical speed sensing device 20 is provided and, as indicated diagrammatically in FIGURE 3, is connected to a controller 21 for a valve 22 which regulates the supply of fluid to the turbine 11.

The turbine 11 comprises a casing formed of two sections 23 and 24 which are secured together by screws 25. The turbine casing is secured to the housing 15 by means of screws 26 which extend through lugs 27 on the housing 15 and are threaded into the casing section 24. A specific feature of the invention is in the provision of bushings 28 within the lugs 27 and around the screws 26, which bushings are of a material having a low coefficient of thermal conductivity.

A further feature of the invention is in the provision of a mounting sleeve 29 between the turbine casing and the housing 15, the sleeve 29 being of a material having a low coefficient of thermal conductivity.

Another feature of the invention is in the provision of a seal member 30 on the shaft 14 which is journaled in an opening 31 in the casing section 24. The seal member 30 serves to minimize the flow of gases from within the turbine casing along the shaft 14. It is of a material having a low coefficient of thermal conductivity to minimize heat transfer from the casing section 24 to the bearings for the shaft 14. In addition, the seal member 30 is formed with a plurality of axially spaced annular grooves 32 to further reduce the conduction of heat. The seal member 30 is also provided with a recess 33 in its inner surface to further reduce the conduction of heat.

To further reduce the conduction of heat from the turbine casing to the housing 15 and the bearings for the shaft 14, a shield or spacer 34 is disposed about the shaft 14 and the seal member 30 within the mounting sleeve 29. The spacer member 34 is preferably formed of a material having a low coefficient of thermal conductivity. In addition, it is provided with a recess or groove 35 extending radially outwardly from the inner surface thereof to reduce the conduction of heat.

There is a possibility of some leakage of gases past the seal member 30 and a vent is provided to allow escape of such gases to the surrounding space, without flow into the housing 15. For this purpose, the spacer 34 is provided with an annular recess 36 in the outer face thereof and a plurality of ports 37 extending radially outwardly from the recess 36. The mounting sleeve 29 is similarly provided with ports 38 which may be aligned with the ports 37. Preferably, the spacer 34 is provided with an annular groove 39 in its outer surface to insure communication between the ports 37 and 38 regardless of the relative alignment thereof. In addition to providing for flow of gases, the recess 36 and the ports 37 and 38 serve to further reduce the thermal conductivity of the members, to minimize transfer of heat from the turbine casing to the housing 15.

To journal the shaft 14 in the housing 15, a pair of ball bearing assemblies 40 and 41 are provided. The bearing assembly 40, an inner race member 42, an outer race member 43 and a plurality of balls 44. The bearing assembly 41 similarly comprises an inner race member 45, an outer race member 46 and a plurality of balls 47. The inner bearing members 42 and 45 are disposed on the shaft 14 with a spacer sleeve 48 therebetween. According to this invention, the outer bearing members 43 and 46 are disposed within a sleeve 49 which is disposed in a bore 50 of the housing 15. The sleeve 49 is of a material having a low coefficient of thermal conductivity.

The sleeve 49, and also the elements 28, 29, 30 and 34, are preferably of a nickel base alloy designed to provide a low coefficient of thermal conductivity, while providing the high strength and resistance to corrosion. Most preferably, these elements are of a nickel base alloy having a high molybdenum content. It has been found that an alloy of 60–65% nickel, 25–35% molybdenum, 5% iron, and 0.5% manganese is particularly suitable. This material has a thermal conductivity of 6.55 B.t.u. per sq. ft. per ft. per hour per degree F. as compared to 28.2 for steel; a thermal diffusivity of 0.125 sq. ft. per lb. versus .731 for steel; a thermal coefficient of expansion of .0000056 inch per degree F. versus 0.0000065 for steel and a specific weight of 577 lbs. per cu. ft. versus 490 for steel. Its other mechanical properties are similar to those for medium carbon steels. In addition to its excellent mechanical and thermal properties, it has been found that this material has excellent corrosion resistance properties.

It is to be noted that the housing 15 and also the turbine casing are of iron, steel or similar materials having a relatively high coefficient of thermal conductivity. Accordingly, the heat generated in the turbine will be dissipated into the surrounding space through the turbine casing and will not flow to the unit 10, due to the provision of the elements of low thermal conductivity as described above. Further, any heat that is transferred to the housing 15 for the unit 10 will be dissipated into the surrounding space and will not flow to the bearings, due to the provision of the sleeve 49 of low thermal conductivity.

A further feature of the invention is in the provision of grease chambers of minimum volume, to minimize any pumping action produced by the bearings, and to minimize flow of grease during high rates of acceleration. In particular, the spacer 34 is disposed closely adjacent the bearing assembly 40 to form a grease retainer and a ring 51 is disposed on the inner side of the bearing assembly 40 to form another grease retainer. A spring retaining ring 52 is disposed between the outer bearing member 43 and the grease retainer 51. The spacer 34 and the grease retainer 51 may, if desired, be provided with annular grooves directly opposite the ball bearing members 44, as illustrated, but it will be appreciated that the grease chambers should be of the smallest possible size commensurate with adequate supply of lubrication. An O-ring seal 53 is provided between the outer surface of the grease retainer 51 and the inner surface of the sleeve 49.

With respect to the bearing assembly 41, a grease retainer ring 54 is disposed closely adjacent the inner side thereof and a grease retainer 55 is disposed on the outer side thereof. O-ring seals 56 and 57 are provided between the grease retainers 54 and 55, respectively, and the inner surface of the sleeve 49. The grease retainer 55 has an integral reduced diameter sleeve portion 58 which is integrally connected to a portion 59 which is recessed to receive a coiled compression spring 60 also engaged in a recess in the grease retainer 51. The spring 60 serves to urge the grease retainer 51 against the retaining ring 52 and also serves to urge the grease retainer 55 and the bearing assembly 41 toward the grease retainer 54, to thus fix the axial position of the parts.

The bearing support of the shaft 18 is similar to that for the shaft 14. In particular, it comprises a pair of ball bearing assemblies 61 and 62 assembled within the sleeve 63 within a bore 64 in the housing 15. The sleeve 63 is preferably of a material having a low thermal conductivity relative to the thermal conductivity of the housing.

A pair of grease retainer rings 65 and 66 are disposed on opposite sides of the bearing assembly 61 with O-rings 67 and 68 respectively disposed between the grease retainers 65 and 66 and the inside surface of the sleeve 63. A similar pair of grease retainer rings 69 and 70 are disposed closely adjacent opposite sides of the bearing assembly 62 with corresponding O-rings 71 and 72. The grease retainer rings 66 and 69 are recessed to receive a spring 73 which acts to hold the parts in fixed assembly.

It may here be noted that the intermediate portions of the sleeves 49 and 63 may have slightly reduced diameters to reduce heat conduction between the sleeves and the housing. The chambers so defined are connected together by a passage 74 and are connected to the gear chamber by means of a groove 75.

The speed sensing unit 20 comprises a coil which is mounted within a sleeve 76 threaded into the housing 15, and a rotor 77 which is secured to the end of the shaft 18 by means of a screw 78. The rotor 77 is magnetized to define a plurality of magnetic pawls and as the shaft is rotated, an alternating electrical signal is generated in the coil having a frequency proportional to the speed of rotation of the shaft 18. This signal is used to control the controller 21 which controls operation of the valve 22. Such a system is known in the art and is not therefore described in detail.

It will be understood that modifications and variations may be effected without departing from the spirit and scope of the novel concepts of this invention.

I claim as my invention:

In a drive coupling for connecting a load to a high temperature motive power source which includes a casing, a housing, means including an annular sleeve member for mounting said casing on one end of said housing, and a shaft journalled in said housing and having an end portion projecting from said one end of said housing through said annular member and into said casing, said sleeve member having a plurality of circumferentially spaced radial ports therethrough for flow of hot gases radially outwardly therethrough and said sleeve having a low thermal conductivity cooperating with the ports to minimize axial heat conduction across the sleeve between the casing and said housing.

References Cited in the file of this patent

UNITED STATES PATENTS

| | | |
|---|---|---|
| 1,889,689 | Houston | Feb. 28, 1933 |
| 1,953,540 | Ogden | Apr. 3, 1934 |
| 2,109,997 | Hoffmann | Mar. 1, 1938 |
| 2,405,122 | Firth | Aug. 6, 1946 |
| 2,440,890 | Birmann | May 4, 1948 |
| 2,484,275 | Eastman | Oct. 11, 1949 |
| 2,578,785 | Davis | Dec. 18, 1951 |
| 2,600,912 | Olson | June 17, 1952 |
| 2,614,798 | Rubbra | Oct. 21, 1952 |
| 2,635,016 | Doniak | Apr. 14, 1953 |
| 2,646,210 | Kohlmann | July 21, 1953 |
| 2,662,725 | McVeigh | Dec. 15, 1953 |
| 2,669,881 | Skidmore | Feb. 23, 1954 |
| 2,680,001 | Batt | June 1, 1954 |
| 2,689,707 | Graham et al. | Sept. 21, 1954 |
| 2,694,157 | Cone | Nov. 9, 1954 |
| 2,757,052 | Spurgeon | July 31, 1956 |
| 2,822,974 | Mueller | Feb. 11, 1958 |
| 2,869,939 | Muth et al. | Jan. 20, 1959 |
| 2,918,207 | Moore | Dec. 22, 1959 |

FOREIGN PATENTS

| | | |
|---|---|---|
| 336,914 | Great Britain | Feb. 5, 1930 |